(12) United States Patent
Mizuta et al.

(10) Patent No.: US 10,392,473 B2
(45) Date of Patent: Aug. 27, 2019

(54) MONOMER COMPOSITION AND CURABLE COMPOSITION CONTAINING SAME

(71) Applicant: DAICEL CORPORATION, Osaka-shi, Osaka (JP)

(72) Inventors: Tomoya Mizuta, Tokyo (JP); Keizo Inoue, Himeji (JP)

(73) Assignee: DAICEL CORPORATION, Osaka-Shi, Osaka (JP)

( * ) Notice: Subject to any disclaimer, the term of this patent is extended or adjusted under 35 U.S.C. 154(b) by 72 days.

(21) Appl. No.: 15/321,271

(22) PCT Filed: Jun. 23, 2015

(86) PCT No.: PCT/JP2015/068085
§ 371 (c)(1),
(2) Date: Dec. 22, 2016

(87) PCT Pub. No.: WO2015/199091
PCT Pub. Date: Dec. 30, 2015

(65) Prior Publication Data
US 2017/0158814 A1 Jun. 8, 2017

(30) Foreign Application Priority Data
Jun. 27, 2014 (JP) ................ 2014-133054

(51) Int. Cl.
C08G 65/26 (2006.01)
C08F 16/14 (2006.01)
C08F 216/14 (2006.01)
C09D 11/101 (2014.01)
C09D 11/30 (2014.01)
C09D 4/00 (2006.01)

(52) U.S. Cl.
CPC .......... C08G 65/2603 (2013.01); C08F 16/14 (2013.01); C08F 216/14 (2013.01); C09D 4/00 (2013.01); C09D 11/101 (2013.01); C09D 11/30 (2013.01)

(58) Field of Classification Search
CPC .... C08G 65/2603; C08F 16/14; C08F 216/14; C09D 11/101; C09D 11/30; C09D 4/00
USPC ........................................................ 523/400
See application file for complete search history.

(56) References Cited

U.S. PATENT DOCUMENTS

| | | |
|---|---|---|
| 3,598,765 A | 8/1971 | Achon et al. |
| 4,009,182 A | 2/1977 | Ardis et al. |
| 4,965,342 A | 10/1990 | Vandenberg et al. |
| 2004/0019128 A1 | 1/2004 | Kondo |
| 2004/0050292 A1 | 3/2004 | Nakajima et al. |
| 2004/0259971 A1 | 12/2004 | Sasa |
| 2005/0113476 A1 | 5/2005 | Akiyama et al. |
| 2006/0223978 A1 | 10/2006 | Kong |
| 2007/0034515 A1 | 2/2007 | Kong et al. |
| 2007/0101898 A1 | 5/2007 | Akiyama et al. |
| 2007/0185224 A1 | 8/2007 | Akiyama et al. |
| 2007/0202437 A1 | 8/2007 | Ishibashi et al. |
| 2007/0270520 A1 | 11/2007 | Akiyama et al. |
| 2008/0272328 A1 | 11/2008 | Kong |
| 2008/0296159 A1 | 12/2008 | Kong et al. |
| 2010/0026711 A1 | 2/2010 | Muramoto |
| 2012/0027342 A1 | 2/2012 | Yoshida et al. |
| 2015/0368397 A1 | 12/2015 | Suwa et al. |

FOREIGN PATENT DOCUMENTS

| | | |
|---|---|---|
| EP | 1 826 252 A1 | 8/2007 |
| EP | 2 226 367 A1 | 9/2010 |
| JP | 2-29428 A | 1/1990 |

(Continued)

OTHER PUBLICATIONS

Extended European Search Report dated Nov. 13, 2017, in European Patent Application No. 15812150.9.
Extended European Search Report dated Nov. 8, 2017, in European Patent Application No. 15812646.6.
Extended European Search Report issued in European Application No. 15810852.2 dated Nov. 16, 2017.
Extended European Search Report issued in European Application No. 15811102.1 dated Jan. 4, 2018.
International Search Report, issued in PCT/JP2015/068084, dated Aug. 18, 2015.

(Continued)

*Primary Examiner* — David T Karst
(74) *Attorney, Agent, or Firm* — Birch, Stewart, Kolasch & Birch, LLP

(57) ABSTRACT

Provided is a monomer composition that has rapid curability and can be rapidly cured even in the presence of oxygen and/or water to form a cured product having excellent adhesion to a wide variety of substrates. The monomer composition contains a multifunctional vinyl ether compound in an amount of 10 to 80 weight percent, a bifunctional oxetane compound represented by Formula (b) in an amount of 0.5 to 20 weight percent, and a monofunctional oxetane compound represented by Formula (b') in an amount of 5 to 80 weight percent. In the formulae, Ring Z is selected from an aromatic hydrocarbon ring and a structure including two or more aromatic hydrocarbon rings bonded to each other through a single bond or a linkage group; R represents a monovalent aliphatic hydrocarbon group; R' is selected from hydrogen and ethyl; and m represents an integer of 0 or more.

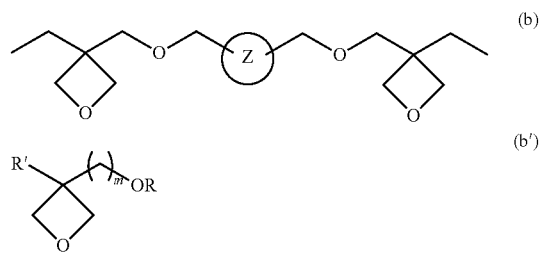

9 Claims, No Drawings

(56) References Cited

FOREIGN PATENT DOCUMENTS

| | | |
|---|---|---|
| JP | 9-183927 A | 7/1997 |
| JP | 2004-10783 A | 1/2004 |
| JP | 2004-91552 A | 3/2004 |
| JP | 2005-154734 A | 6/2005 |
| JP | 2007-137926 A | 6/2007 |
| JP | 2007-211098 A | 8/2007 |
| JP | 2007-211099 A | 8/2007 |
| JP | 2012-36155 A | 8/2007 |
| JP | 2008-087252 A | 4/2008 |
| JP | 2008-189821 A | 8/2008 |
| JP | 2008-535975 A | 9/2008 |
| JP | 2010-7000 A | 1/2010 |
| JP | 2014-201534 A | 10/2014 |
| WO | WO 2008/111283 A1 | 9/2008 |
| WO | WO 2011/125538 A1 | 10/2011 |
| WO | WO 2014/046095 A1 | 3/2014 |

OTHER PUBLICATIONS

International Search Report, issued in PCT/JP2015/068085, dated Sep. 29, 2015.
International Search Report, issued in PCT/JP2015/068086, dated Aug. 18, 2015.
International Search Report, issued in PCT/JP2015/068087, dated Sep. 15, 2015.
Written Opinion of the International Searching Authority (PCT/ISA/237), issued in PCT/JP2015/068084, dated Aug. 18, 2015.
Written Opinion of the International Searching Authority (PCT/ISA/237), issued in PCT/JP2015/068085, dated Sep. 29, 2015.
Written Opinion of the International Searching Authority (PCT/ISA/237), issued in PCT/JP2015/068086, dated Aug. 18, 2015.
Written Opinion of the International Searching Authority (PCT/ISA/237), issued in PCT/JP2015/068087, dated Sep. 15, 2015.
Office Action dated Jun. 11, 2018 in U.S. Appl. No. 15/321,471.
Japanese Notification of Reasons for Refusal for Application No. 2015-126001, dated Sep. 25, 2018, with English language translation.
Daicel, "Celloxide 2021P," retrieved from URL:https://www.daicel.com/yuuki/en/product/index.php?act=detail&page1&id=220, retrieved Aug. 9, 2018, 1 page.
U.S. Office Action for U.S. Appl. No. 15/321,432, dated Aug. 7, 2018.
Office Action issued in the related European Patent Application No. 15810852.2, dated Nov. 8, 2018.

MONOMER COMPOSITION AND CURABLE COMPOSITION CONTAINING SAME

TECHNICAL FIELD

The present invention relates to a monomer composition, and a curable composition containing the monomer composition. The curable composition is advantageously used for UV-curable (ultraviolet-curable) inkjet inks. This application claims priority to Japanese Patent Application No. 2014-133054, filed Jun. 27, 2014 to Japan, the entire contents of which are incorporated herein by reference.

BACKGROUND ART

Inkjet recording is a technique in which ink droplets are ejected (jetted) onto a recording medium to form recording dots as printing. This technique does not require master plates and is advantageously used in small-quantity wide-variety printing applications. Known inkjet inks for use in the inkjet recording technique include cationically-curable inks and radically-curable inks.

The radically-curable inks have been widely used typically because these inks have rapid curability and can be derived from a wide variety of monomers. However, from the viewpoint of dischargeability, the inkjet recording technique employs low-viscosity inks, which allow oxygen in the air to readily diffuse/migrate into the inks. In addition, such inks, as being formed into small droplets upon printing, have large surface areas and are readily exposed to oxygen. Disadvantageously, therefore, the radically-curable inks significantly suffer from cure inhibition by oxygen and are inhibited from curing by oxygen. This causes the radically-curable inks to bleed and/or to include large amounts of residual, unreacted monomers which cause odors. Additionally disadvantageously, the radically-curable inks have poor substrate adhesion and require processing on the substrate surface so as to offer better adhesion.

In contrast, the cationically-curable inks do not suffer from cure inhibition by oxygen. In addition, these inks are known to have superior substrate adhesion as compared with the radically-curable inks. Patent Literature (PTL) 1, PTL 2, and PTL 3 each describe that a cationically-curable ink including a dispersion medium and a pigment can form an ink layer having excellent curability and excellent adhesion to the substrate (substrate adhesion), when monomers constituting the dispersion medium contain a vinyl ether compound having a cyclic ether skeleton in an amount of 30 weight percent or more of all monomers contained in the dispersion medium.

CITATION LIST

Patent Literature

PTL 1: Japanese Unexamined Patent Application Publication (JP-A) No. 2005-154734
PTL 2: JP-A No. 2007-211098
PTL 3: JP-A No. 2007-211099

SUMMARY OF INVENTION

Technical Problem

However, such cationically-curable inks containing a divinyl ether compound having a cyclic ether skeleton were found to be practically unsuitable. This is because the divinyl ether compound having a cyclic ether skeleton tends to absorb moisture (water) and causes the cationically-curable inks to be susceptible to cure inhibition by water and to undergo curing failure when used in humid periods and/or when absorbing moisture from the air during the storage process.

Accordingly, the present invention has an object to provide a monomer composition that has rapid curability and can be rapidly cured even in the presence of oxygen and/or water, to form a cured product having excellent adhesion to a wide variety of substrates.

The present invention has another object to provide a curable composition including the monomer composition and a photoacid generator.

The present invention has yet another object to provide a UV-curable inkjet ink including the curable composition and a pigment.

Solution to Problem

After intensive investigations to achieve the objects, the inventors of the present invention found a curable composition including a monomer composition containing a multifunctional vinyl ether compound, a bifunctional oxetane compound having an aromatic ring skeleton, and a monofunctional oxetane compound containing an aliphatic hydrocarbon group in specific proportions; and found that this curable composition can be rapidly cured by ultraviolet irradiation even in the presence of oxygen and/or water, to form a cured product having excellent adhesion to a wide variety of substrates (namely, having selectivity to a wide variety of substrates). The present invention has been made on the basis of these findings.

Specifically, the present invention provides, in one aspect, a monomer composition containing at least one vinyl ether compound (A) and at least one oxetane compound (B). The at least one vinyl ether compound (A) includes a multifunctional vinyl ether compound in an amount of 10 to 80 weight percent of the total weight of the monomer composition. The at least one oxetane compounds (B) includes a bifunctional oxetane compound represented by Formula (b) in an amount of 0.5 to 20 weight percent of the total weight of the monomer composition, and a monofunctional oxetane compound represented by Formula (b') in an amount of 5 to 80 weight percent of the total weight of the monomer composition. Formulae (b) and (b') are expressed as follows:

[Chem. 1]

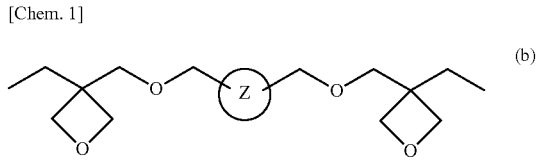

(b)

where Ring S is selected from an aromatic hydrocarbon ring and a structure including two or more aromatic hydrocarbon rings bonded to each other through a single bond or a linkage group,

[Chem. 2]

(b')

where R represents a monovalent aliphatic hydrocarbon group; R' is selected from hydrogen and ethyl; and m represents an integer of 0 or more.

In the monomer composition, the multifunctional vinyl ether compound may include a compound having a structure including an alicyclic hydrocarbon group or heterocyclic group with two or more vinyl ether groups being bonded.

The monomer composition may further contain an epoxy compound (C) including an epoxy compound containing a cyclohexene oxide group, where the epoxy compound (C) serves as a cationically curable monomer.

In the monomer composition, the epoxy compound (C) may be present in a content of 5 to 80 weight percent of the total weight of the monomer composition.

The present invention also provides, in another aspect, a curable composition containing the monomer composition and a photoacid generator.

The curable composition may further contain a sensitizer alone or in combination with a sensitizing auxiliary.

The curable composition may have a surface tension (at 25° C. and 1 atmospheric pressure) of 10 to 50 mN/m and a viscosity (at 25° C. and a shear rate of 10 (1/s)) of 1 to 1000 mPa·s.

The curable composition may be used in a UV-curable inkjet ink.

The present invention provides, in yet another aspect, a UV-curable inkjet ink containing the curable composition and at least one selected from the group consisting of pigments and dyes.

The UV-curable inkjet ink may further contain a dispersant.

Specifically, the present invention relates to followings.

(1) The present invention relates to a monomer composition containing at least one vinyl ether compound (A) and at least one oxetane compound (B). The at least one vinyl ether compound (A) includes a multifunctional vinyl ether compound in an amount of 10 to 80 weight percent of the total weight of the monomer composition. The at least one oxetane compound (B) includes a bifunctional oxetane compound represented by Formula (b) in an amount of 0.5 to 20 weight percent of the total weight of the monomer composition, and a monofunctional oxetane compound represented by Formula (b') in an amount of 5 to 80 weight percent of the total weight of the monomer composition.

(2) In the monomer composition according to (1), the multifunctional vinyl ether compound may include a compound having a structure including an alicyclic hydrocarbon group or heterocyclic group with two or more vinyl ether groups being bonded.

(3) In the monomer composition according to one of (1) and (2), the multifunctional vinyl ether compound may include at least one of a compound represented by Formula (a-1) and a compound represented by Formula (a-2) in an amount of 10 weight percent or more of the total weight of all vinyl ether compounds contained in the monomer composition.

(4) The monomer composition according to any one of (1) to (3) may further contain an epoxy compound (C) including an epoxy compound containing a cyclohexene oxide group, where the epoxy compound (C) serves as a cationically curable monomer.

(5) In the monomer composition according to (4), the epoxy compound (C) may be present in a content of 5 to 80 weight percent of the total weight of the monomer composition.

(6) The present invention also relates to a curable composition containing the monomer composition according to any one of (1) to (5), and a photoacid generator.

(7) The curable composition according to (6) may further contain a sensitizer alone or in combination with a sensitizing auxiliary.

(8) The curable composition according to one of (6) and (7) may have a surface tension (at 25° C. and 1 atmospheric pressure) of 10 to 50 mN/m and a viscosity (at 25° C. and a shear rate of 10 (1/s)) of 1 to 1000 mPa·s.

(9) The curable composition according to any one of (6) to (8) may be used in or for a UV-curable inkjet ink.

(10) The present invention also relates to a UV-curable inkjet ink containing the curable composition according to any one of (6) to (9), and at least one selected from the group consisting of pigments and dyes.

(11) The UV-curable inkjet ink according to (10) may further contain a dispersant.

Advantageous Effects of Invention

The monomer composition according to the present invention has the above-mentioned configuration and, when incorporated with a photoacid generator, gives a curable composition as follows. This curable composition has low viscosity and offers excellent dischargeability before ultraviolet irradiation, and, upon ultraviolet irradiation, can be rapidly cured even in the presence of oxygen and/or water to form a cured product having excellent adhesion to a wide variety of substrates. The curable composition resists deterioration in curability even when absorbing moisture (water) from the air during the storage process. Namely, the curable composition has excellent storage stability. In addition, the curable composition according to the present invention, as having excellent curability, less causes monomers to remain as unreacted and significantly less causes odors derived from such unreacted monomers. Thus, the curable composition according to the present invention is advantageously usable for UV-curable inkjet inks.

The UV-curable inkjet ink according to the present invention includes the curable composition having the characteristic properties and, when used, can form an ink layer with extremely high definition in an air atmosphere at high speed, where the ink layer can be formed without limitations on humidity conditions and on the substrate (article to be printed), while less causing odors. The UV-curable inkjet ink according to the present invention is therefore advantageously usable in the field of industrial printing.

DESCRIPTION OF EMBODIMENTS

Vinyl Ether Compound (A)

The presence of a multifunctional vinyl ether compound, which is a cationically polymerizable monomer, features the monomer composition according to the present invention.

The multifunctional vinyl ether compound is represented typically by Formula (a):

where R'' is selected from a t-valent hydrocarbon group, a t-valent heterocyclic group, and a t-valent group including two or more of these groups bonded to each other through a single bond or a linkage group; and t represents an integer of 2 or more.

The hydrocarbon group may be selected from aliphatic hydrocarbon groups, alicyclic hydrocarbon groups, and aromatic hydrocarbon groups.

Non-limiting examples of divalent aliphatic hydrocarbon groups include $C_1$-$C_{20}$ linear or branched alkylene such as methylene, ethylene, propylene, trimethylene, tetramethylene, hexamethylene, octamethylene, decamethylene, and dodecamethylene; and $C_2$-$C_{20}$ alkenylene such as vinylene and propenylene. Examples of the t-valent aliphatic hydrocarbon groups include groups resulting from further removing "t–2" hydrogen atoms each from the structural formulae of the divalent aliphatic hydrocarbon groups.

Alicyclic rings constituting the alicyclic hydrocarbon groups include monocyclic hydrocarbon rings and polycyclic hydrocarbon rings (spiro hydrocarbon rings, hydrocarbon ring assemblies, bridged hydrocarbon rings, fused hydrocarbon rings, and bridged fused hydrocarbon rings). Examples of the t-valent alicyclic hydrocarbon groups include groups resulting from removing "t" hydrogen atoms each from the structural formulae of the alicyclic rings.

Non-limiting examples of the monocyclic hydrocarbon rings include $C_3$-$C_{12}$ cycloalkane rings such as cyclopropane, cyclobutane, cyclopentane, cyclohexane, cycloheptane, and cyclooctane rings; and $C_3$-$C_{12}$ cycloalkene rings such as cyclopentene and cyclohexene rings.

Non-limiting examples of the Spiro hydrocarbon rings include $C_5$-$C_{16}$ Spiro hydrocarbon rings such as spiro[4.4]nonane, spiro[4.5]decane, and spirobicyclohexane rings.

Non-limiting examples of the hydrocarbon ring assemblies include hydrocarbon ring assemblies each including two or more of $C_5$-$C_{12}$ cycloalkane rings such as bicyclohexane ring.

Non-limiting examples of the bridged hydrocarbon rings include bicyclic hydrocarbon rings such as pinane, bornane, norpinane, norbornane, norbornene, bicycloheptane, bicycloheptene, and bicyclooctane (e.g., bicyclo[2.2.2]octane and bicyclo[3.2.1]octane) rings; tricyclic hydrocarbon rings such as homobledane, adamantane, tricyclo[5.2.1.0$^{2,6}$]decane, and tricyclo[4.3.1.1$^{2,5}$]undecane rings; and tetracyclic hydrocarbon rings such as tetracyclo[4.4.0.1$^{2,5}$ 0.1$^{7,10}$]dodecane and perhydro-1,4-methano-5,8-methanonaphthalene rings.

The fused hydrocarbon rings include fused rings each including two or more of 5- to 8-membered cycloalkane rings fused to each other, such as perhydronaphthalene (decahydronaphthalene), perhydroanthracene, perhydrophenanthrene, perhydroacenaphthene, perhydrofluorene, perhydroindene, and perhydrophenalene rings.

Non-limiting examples of the bridged fused hydrocarbon rings include dimers of dienes, including dimers of cycloalkadienes such as cyclopentadiene, cyclohexadiene, and cycloheptadiene; and hydrogenated derivatives of them.

Non-limiting examples of aromatic rings constituting the aromatic hydrocarbon groups include aromatic rings containing about 6 to about 14 carbon atoms, such as benzene and naphthalene rings, of which those containing about 6 to about 10 carbon atoms are preferred. Examples of the t-valent aromatic hydrocarbon group include groups resulting from removing "t" hydrogen atoms each from the structural formulae of the aromatic rings.

The hydrocarbon group may have one or more of various substituents. Non-limiting examples of the substituents include halogen, oxo, hydroxy, substituted oxy (such as alkoxy, aryloxy, aralkyloxy, and acyloxy), carboxy, substituted oxycarbonyl (such as alkoxycarbonyl, aryloxycarbonyl, and aralkyloxycarbonyl), substituted or unsubstituted carbamoyl, cyano, nitro, substituted or unsubstituted amino, sulfo, and heterocyclic groups. The hydroxy and carboxy may each be protected with a protecting group which is commonly used in the field of organic synthesis.

Non-limiting examples of a heterocyclic ring constituting the heterocyclic group include oxygen-containing heterocyclic rings, sulfur-containing heterocyclic rings, and nitrogen-containing heterocyclic rings, where oxygen, sulfur, and nitrogen each serve as a heteroatom. Non-limiting examples of the oxygen-containing heterocyclic rings include 4-membered rings such as oxetane ring; 5-membered rings such as furan, tetrahydrofuran, oxazole, isoxazole, and y-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Non-limiting examples of the sulfur-containing heterocyclic rings include 5-membered rings such as thiophene, thiazole, isothiazole, and thiadiazole rings; 6-membered rings such as 4-oxo-4H-thiopyran ring; and fused rings such as benzothiophene ring. Non-limiting examples of the nitrogen-containing heterocyclic rings include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. The heterocyclic group may have one or more substituents. Non-limiting examples of the substituents include the substituents which the hydrocarbon group may have; as well as alkyl (including $C_1$-$C_4$ alkyl such as methyl and ethyl), cycloalkyl, and aryl (such as phenyl and naphthyl). Examples of the t-valent heterocyclic group include groups resulting from removing "t" hydrogen atoms each from the structural formulae of the heterocyclic rings.

Non-limiting examples of the linkage group include carbonyl (—CO—), ether bond (—O—), thioether bond (—S—), ester bond (—COO—), amido bond (—CONH—), carbonate bond (—OCOO—), silyl bond (—Si—), and groups each including two or more of these groups linked to each other.

Concrete, but non-limiting examples of the vinyl ether compound include divinyl ethers such as divinyl ether, ethylene glycol divinyl ether, diethylene glycol divinyl ether, triethylene glycol divinyl ether, tetraethylene glycol divinyl ether, polyethylene glycol divinyl ethers, propylene glycol divinyl ether, dipropylene glycol divinyl ether, tripropylene glycol divinyl ether, polypropylene glycol divinyl ethers, butanediol divinyl ethers, neopentyl glycol divinyl ether, hexanediol divinyl ethers, nonanediol divinyl ethers, hydroquinone divinyl ether, 1,4-cyclohexanediol divinyl ether, 1,4-cyclohexanedimethanol divinyl ether, trimethylolpropane divinyl ether, ethylene-oxide-added trimethylolpropane divinyl ether, pentaerythritol divinyl ether, ethylene-oxide-added pentaerythritol divinyl ether, a compound represented by Formula (a-1), and a compound represented by Formula (a-2); trivinyl ethers such as trimethylolpropane trivinyl ether, ethylene-oxide-added trimethylolpropane trivinyl ether, pentaerythritol trivinyl ether, and ethylene-oxide-added pentaerythritol trivinyl ether; tetravinyl ethers such as pentaerythritol tetravinyl ether, ethylene-oxide-added pentaerythritol tetravinyl ether, and ditrimethylolpropane tetravinyl ether; and dipentaerythritol hexavinyl ether. The monomer composition may contain each of them alone or in combination.

[Chem. 3]

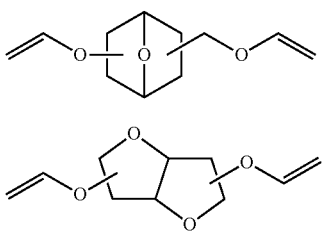

(a-1)

(a-2)

The multifunctional vinyl ether compounds can each be produced using any of known methods for producing vinyl ether compounds. For example, the compound represented by Formula (a-1) can be produced by reacting 2-hydroxy-6-hydroxymethyl-7-oxabicyclo[2.2.1]heptane and a vinyl ester compound (such as vinyl propionate) with each other in the presence of a transition metal compound.

Among such multifunctional vinyl ether compounds for use in the present invention, the monomer composition preferably contains a compound having a structure including an alicyclic hydrocarbon group or heterocyclic group with two or more vinyl ether groups being bonded. This is preferred for a higher curing rate. Non-limiting examples of the compound just mentioned above include the multifunctional vinyl ether compounds of Formula (a) in which R" is selected from an alicyclic hydrocarbon group and a heterocyclic group, of which divinyl ether compounds are typified. The compound having a structure including an alicyclic hydrocarbon group or heterocyclic group with two or more vinyl ether groups being bonded may be present in a content of preferably 10 weight percent or more, particularly preferably 40 weight percent or more, and most preferably 70 weight percent or more, of the total weight of all vinyl ether compounds contained in the monomer composition according to the present invention. The upper limit of the content is 100 weight percent.

Oxetane Compound (B)

The monomer composition according to the present invention contains one or more bifunctional oxetane compounds represented by Formula (b) below. The bifunctional oxetane compounds are cationically polymerizable monomers and have the function of restraining cure inhibition by water.

[Chem. 4]

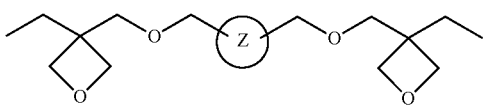

(b)

In the formula, Ring Z is selected from an aromatic hydrocarbon ring and a structure including two or more aromatic hydrocarbon rings bonded to each other through a single bond or a linkage group. Specifically, Z represents a divalent group resulting from removing two hydrogen atoms from the aromatic hydrocarbon ring or the structure including two or more aromatic hydrocarbon rings bonded to each other through a single bond or a linkage group.

Non-limiting examples of the aromatic hydrocarbon ring include aromatic hydrocarbon rings containing about 6 to about 14 carbon atoms, such as benzene, naphthalene, and anthracene rings.

Non-limiting examples of the linkage group include divalent hydrocarbon groups, carbonyl (—CO—), ether bond (—O—), ester bond (—COO—), carbonate (—O—CO—O—), amido (—CONN—), and groups each including two or more of them linked to each other.

Non-limiting examples of the divalent hydrocarbon groups include $C_1$-$C_{18}$ linear or branched alkylene and $C_3$-$C_{18}$ divalent alicyclic hydrocarbon groups. Non-limiting examples of the $C_1$-$C_{18}$ linear or branched alkylene include methylene, methylmethylene, dimethylmethylene, ethylene, propylene, and trimethylene. Non-limiting examples of the $C_3$-$C_{18}$ divalent alicyclic hydrocarbon groups include divalent cycloalkylene (including cycloalkylidene), such as 1,2-cyclopentylene, 1,3-cyclopentylene, cyclopentylidene, 1,2-cyclohexylene, 1,3-cyclohexylene, 1,4-cyclohexylene, and cyclohexylidene.

Non-limiting examples of the structure including two or more aromatic hydrocarbon rings bonded through a linkage group include biphenyl, 2,2-diphenylpropane, and diphenylmethane.

The aromatic hydrocarbon ring, and the structure including two or more aromatic hydrocarbon rings bonded to each other through a linkage group may each have one or more substituents. Examples of the substituents are as with the substituents which the hydrocarbon group as R" in Formula (a) may have.

Non-limiting examples of the bifunctional oxetane compounds represented by Formula (b) include 1,4-bis[(3-ethyl-3-oxetanylmethoxy)methyl]benzene (such as a product under the trade name of ARON OXETANE OXT-121, supplied by Toagosei Co., Ltd.); and 4,4'-bis[(3-ethyl-3-oxetanylmethoxy)methyl]biphenyl (such as a product under the trade name of ETERNACOLL OXBP, supplied by Ube Industries, Ltd.).

The monomer composition according to the present invention contains a monofunctional oxetane compound or compounds represented by Formula (b') in combination with the bifunctional oxetane compound or compounds represented by Formula (b). The combination use of the monofunctional oxetane compound(s) allows the monomer composition to have better adhesion to the substrate and to still have lower viscosity. Formula (b') is expressed as follows:

[Chem. 5]

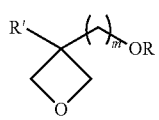

(b')

where R represents a monovalent aliphatic hydrocarbon group; R' is selected from hydrogen and ethyl; and m represents an integer of 0 or more.

Non-limiting examples of the monovalent aliphatic hydrocarbon group include alkyl containing 1 to about 20 carbon atoms, such as methyl, ethyl, propyl, isopropyl, butyl, isobutyl, s-butyl, t-butyl, pentyl, hexyl, decyl, and dodecyl, of which alkyl containing 1 to about 10 carbon atoms is preferred, and alkyl containing 1 to about 3 carbon atoms is particularly preferred; alkenyl containing 2 to about 20 carbon atoms, such as vinyl, allyl, and 1-butenyl, of which alkenyl containing 2 to about 10 carbon atoms is preferred, and alkenyl containing 2 or 3 carbon atoms is particularly preferred; and alkynyl containing 2 to about 20 carbon atoms, such as ethynyl and propynyl, of which alkynyl containing 2 to about 10 carbon atoms is preferred, and alkynyl containing 2 or 3 carbon atoms is particularly preferred.

The number m represents an integer of 0 or more and is typically 0 to 20, and preferably 0 or 1.

Non-limiting examples of the monofunctional oxetane compounds represented by Formula (b') include compounds represented by Formulae (b"-1) to (b'-7):

[Chem. 6]

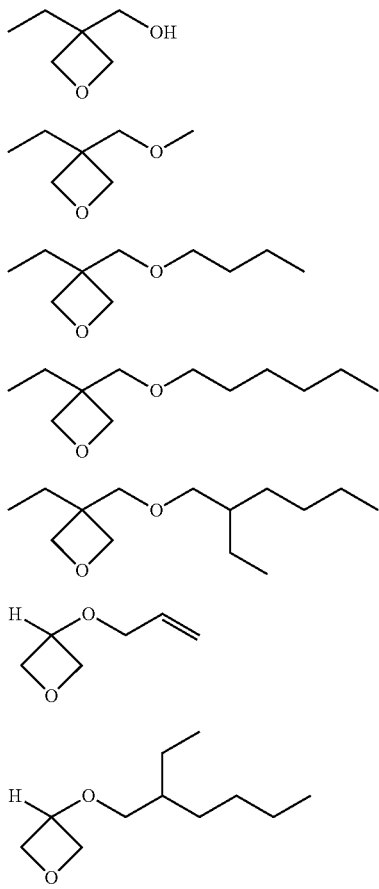

The monofunctional oxetane compound for use in the present invention may also be selected from commercial products available typically as ARON OXETANE OXT-212 and ARON OXETANE OXT-101 (each from Toagosei Co., Ltd.), 3-Allyloxyoxetane, and 3-(2-Ethylhexyl)oxetane.

Other Cationically Polymerizable Monomers

The monomer composition according to the present invention may further contain, as a cationically polymerizable monomer, one or more other cationically polymerizable monomers than the vinyl ether compounds (A) and the oxetane compounds (B). Non-limiting examples of such other cationically polymerizable monomers include epoxy compounds, oxolane compounds, cyclic acetal compounds, cyclic lactone compounds, thiirane compounds, thietane compounds, spiro ortho ester compounds, which are reaction products between an epoxy compound and a lactone, ethylenically unsaturated compounds (such as vinyl compounds), cyclic ether compounds, cyclic thioether compounds, and derivatives of them.

In particular, the monomer composition according to the present invention preferably contains an epoxy compound (C). This is preferred because the monomer composition can form a cured product having excellent adhesion to a wide variety of substrates (namely, having selectivity to a wide variety of substrates).

Non-limiting examples of the epoxy compound (C) include aromatic glycidyl ether epoxy compounds; alicyclic glycidyl ether epoxy compounds such as hydrogenated bisphenol-A diglycidyl ether; aliphatic glycidyl ether epoxy compounds; glycidyl ester epoxy compounds; glycidylamine epoxy compounds; epoxy compounds containing a cyclohexene oxide group (hereinafter also referred to as "cycloaliphatic epoxy compound(s)"); and epoxy-modified siloxane compounds. The monomer composition may contain each of different epoxy compounds alone or in combination.

The epoxy compound (C) for use in the present invention preferably includes any of the cycloaliphatic epoxy compounds. This is preferred because the monomer composition can give a cured product having excellent substrate adhesion and, particularly when used in an inkjet ink, can give a beautiful print that resists scratching and separation and can be maintained over a long time. In particular, the epoxy compound (C) may include the cycloaliphatic epoxy compound in an amount of preferably 30 weight percent or more, particularly preferably 50 weight percent or more, and most preferably 80 weight percent or more, of the total weight of all epoxy compounds contained in the monomer composition.

Non-limiting examples of the cycloaliphatic epoxy compounds include compounds represented by Formula (c):

[Chem. 7]

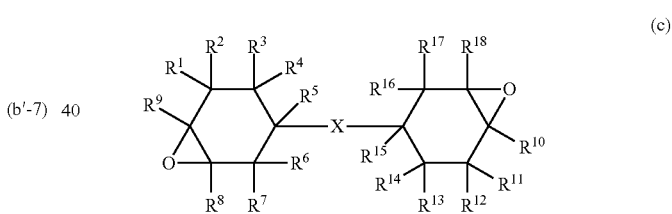

In Formula (c), $R^1$ to $R^{18}$ are each, identically or differently, selected from hydrogen, halogen, a hydrocarbon group optionally containing oxygen or halogen, and optionally substituted alkoxy.

Non-limiting examples of the halogen as $R^1$ to $R^{18}$ include fluorine, chlorine, bromine, and iodine.

Examples of the hydrocarbon group as $R^1$ to $R^{18}$ include monovalent groups corresponding to the t-valent hydrocarbon groups as R in Formula (a).

Non-limiting examples of the hydrocarbon group optionally containing oxygen or halogen, as $R^1$ to $R^{18}$, include groups corresponding to the above-mentioned hydrocarbon groups, except with an oxygen-containing group or halogen replacing at least one hydrogen atom each of the hydrocarbon groups. Non-limiting examples of the oxygen-containing group include hydroxy; hydroperoxy; $C_1$-$C_{10}$ alkoxy such as methoxy, ethoxy, propoxy, isopropyloxy, butoxy, and isobutyloxy; $C_2$-$C_{10}$ alkenyloxy such as allyloxy; tolyloxy, naphthyloxy, and other $C_6$-$C_{14}$ aryloxy which may have one or more substituents selected from $C_1$-$C_{10}$ alkyl, $C_2$-$C_{10}$ alkenyl, halogen, and $C_1$-$C_{10}$ alkoxy; $C_7$-$C_{18}$ aralkyloxy such as benzyloxy and phenethyloxy; $C_1$-$C_{10}$ aryloxy such as acetyloxy, propionyloxy, (meth)acryloyloxy, and benzoyloxy; $C_1$-$C_{10}$ alkoxycarbonyl such as methoxycarbonyl, ethoxycarbonyl, propoxycarbonyl, and butoxycarbonyl; phenoxycarbonyl, tolyloxycarbonyl, naphthyloxycarbonyl, and other $C_6$-$C_{14}$ aryloxycarbonyl which may have one or more substituents selected from $C_1$-$C_{10}$ alkyl, $C_2$-$C_{10}$ alkenyl, halogen, and $C_1$-$C_{10}$ alkoxy; $C_7$-$C_{18}$ aralkyloxycarbonyl such as benzyloxycarbonyl; epoxy-containing groups such as glycidyloxy; oxetanyl-containing groups such as ethyloxetanyloxy; $C_1$-$C_{10}$ acyl such as acetyl, propionyl, and benzoyl; isocyanato; sulfo; carbamoyl; oxo; and groups each including two or more of these groups bonded to each other directly or through a linkage group such as $C_1$-$C_{10}$ alkylene.

Non-limiting examples of the alkoxy as $R^1$ to $R^{18}$ include $C_1$-$C_{10}$ alkoxy such as methoxy, ethoxy, propoxy, isopropyloxy, butoxy, and isobutyloxy.

Non-limiting examples of the substituents which the alkoxy may have include halogen, hydroxy, $C_1$-$C_{10}$ alkoxy, $C_2$-$C_{10}$ alkenyloxy, $C_6$-$C_{14}$ aryloxy, acyloxy, mercapto, alkylthio, $C_2$-$C_{10}$ alkenylthio, $C_6$-$C_{14}$ arylthio, $C_7$-$C_{18}$ aralkylthio, carboxy, alkoxycarbonyl, $C_6$-$C_{14}$ aryloxycarbonyl, $C_7$-$C_{18}$ aralkyloxycarbonyl, amino, mono- or di-($C_1$-$C_{10}$ alkyl)amino, $C_1$-$C_{10}$ acylamino, epoxy-containing groups, oxetanyl-containing groups, $C_1$-$C_{10}$ acyl, oxo, and groups each including two or more of them bonded to each other directly or through a linkage group such as $C_1$-$C_{10}$ alkylene.

In Formula (c), X is selected from a single bond and a linkage group. Non-limiting examples of the linkage group include divalent hydrocarbon groups, alkenylene with part or all of carbon-carbon double bond(s) being epoxidized, carbonyl (—CO—), ether bond (—O—), ester bond (—COO—), carbonate (—O—CO—O—), amido (—CONH—), and groups each including two or more of these groups linked to each other.

Examples of the divalent hydrocarbon groups are as in the bifunctional oxetane compounds represented by Formula (b).

The alkenylene with part or all of carbon-carbon double bond(s) being epoxidized is hereinafter also referred to as "epoxidized alkenylene". Non-limiting examples of the alkenylene moiety in the epoxidized alkenylene include $C_2$-$C_8$ linear or branched alkenylene such as vinylene, propenylene, 1-butenylene, 2-butenylene, butadienylene, pentenylene, hexenylene, heptenylene, and octenylene. In particular, the epoxidized alkenylene is preferably alkenylene with all of carbon-carbon double bond(s) being epoxidized, and is more preferably $C_2$-$C_4$ alkenylene with all of carbon-carbon double bond(s) being epoxidized.

Representative, but non-limiting examples of the compounds represented by Formula (c) include (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, 1,2-bis(3,4-epoxycyclohex-1-yl)ethane, and compounds represented by Formulae (c-1) to (c-8) below. In Formulae (c-5) and (c-7), $n^1$ and $n^2$ each independently represent an integer of 1 to 30. In Formula (c-5), L represents $C_1$-$C_8$ linear or branched alkylene.

[Chem. 8]

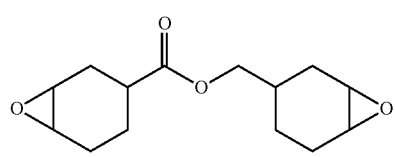
(c-1)

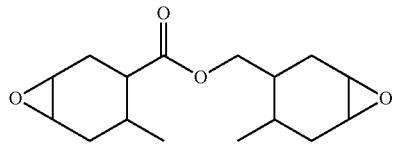
(c-2)

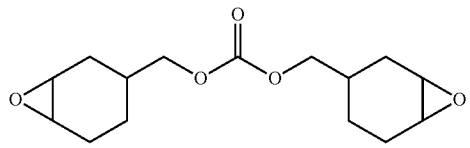
(c-3)

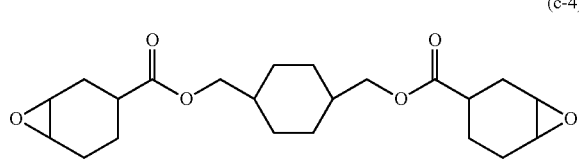
(c-4)

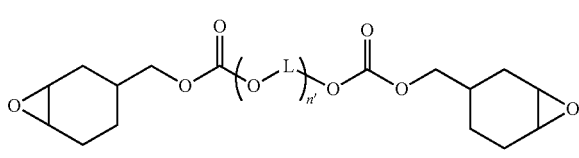
(c-5)

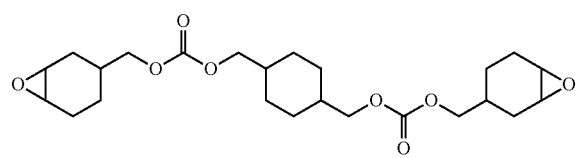
(c-6)

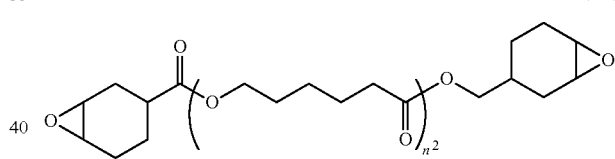
(c-7)

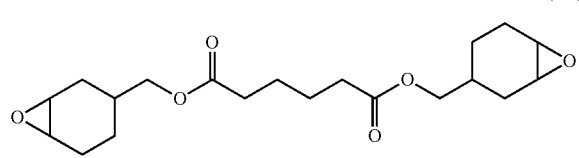
(c-8)

In addition to the compounds represented by Formula (c), the cycloaliphatic epoxy compounds also include compounds containing an alicyclic ring and two or more epoxy groups, where one of the two or more epoxy groups is a cyclohexene oxide group, such as one represented by Formula (c-9):

[Chem. 9]

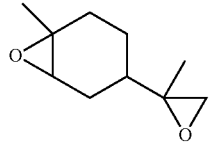
(c-9)

The cycloaliphatic epoxy compounds also include cycloaliphatic epoxy compounds each containing three or more cyclohexene oxide groups, as represented by Formulae (c-10) and (c-11) below; and cycloaliphatic epoxy compounds each containing one cyclohexene oxide group, but being devoid of other epoxy groups, as represented by Formulae (c-12) to (c-14) below. In Formulae (c-10) and (c-11), $n^3$ to $n^8$ each represent, identically or differently, an integer of 1 to 30. In Formula (c-14), $R^{19}$ and $R^{20}$ each represent, identically or differently, $C_1$-$C_{31}$ linear or branched alkyl.

[Chem. 10]

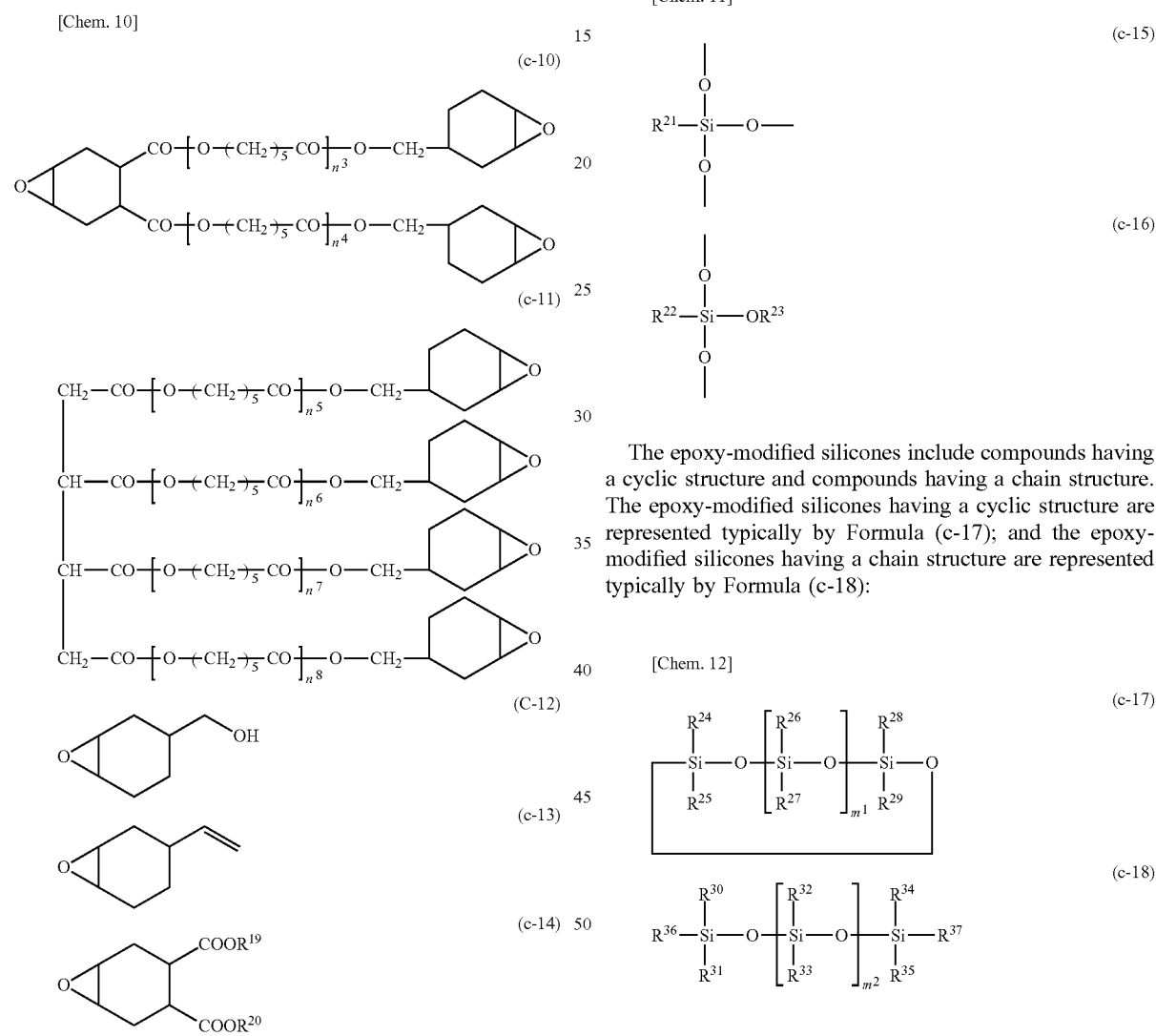

The monomer composition herein preferably contains, as the epoxy compound (C), any of the compounds represented by Formula (c) containing two cyclohexene oxide groups per molecule, and particularly preferably contains 3,4-epoxycyclohexylmethyl (3,4-epoxy)cyclohexanecarboxylate represented by Formula (c-1). This is preferred for excellent adhesion to the substrate (such as glass).

When desired to give a cured product that has high surface hardness and satisfactory heat resistance, the monomer composition may contain an epoxy-modified siloxane compound as the epoxy compound (C).

Non-limiting examples of the epoxy-modified siloxane compound include epoxy-modified polyorganosilsesquioxanes and epoxy-modified silicones. The monomer composition may contain each of them alone or in combination.

Non-limiting examples of the epoxy-modified polyorganosilsesquioxanes include compounds each including any of constitutional units represented by Formulae (c-15) and (c-16) below. Such compounds include compounds of any of random structures, cage-like structures, and ladder-like structures.

[Chem. 11]

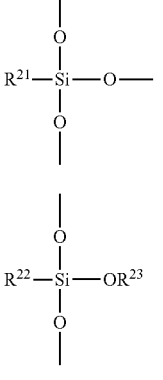

The epoxy-modified silicones include compounds having a cyclic structure and compounds having a chain structure. The epoxy-modified silicones having a cyclic structure are represented typically by Formula (c-17); and the epoxy-modified silicones having a chain structure are represented typically by Formula (c-18):

[Chem. 12]

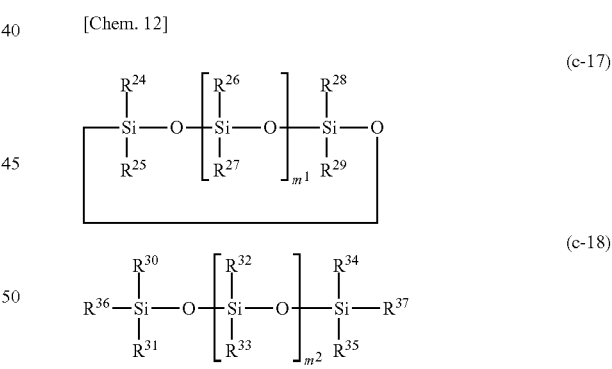

In the formulae, $R^{21}$ to $R^{37}$ are each, identically or differently, selected from hydrogen and a hydrocarbon group optionally containing an oxirane ring. Examples of the hydrocarbon group include the monovalent groups corresponding to the t-valent hydrocarbon groups as R" in Formula (a). The numbers $m^1$ in Formula (c-17) and $m^2$ in Formula (c-18) each represent, identically or differently, an integer of 1 or more. When $m^1$ is an integer of 2 or more, $m^1$ occurrences of $R^{26}$ and $m^1$ occurrences of $R^{27}$ in (c-17) may each be identical or different. When $m^2$ is an integer of 2 or more, $m^2$ occurrences of $R^{32}$ and $m^2$ occurrences of $R^{33}$ in (c-18) may each be identical or different. However, at least one of $R^{21}$ to $R^{23}$ in the polyorganosilsesquioxanes, at least one of $R^{24}$ to $R^{29}$ in the silicones having a cyclic structure, and at least one of $R^{30}$ to $R^{37}$ in the silicones having a chain structure are each independently an oxirane-ring-containing hydrocarbon group (such as a hydrocarbon group containing a cyclohexene oxide group, or a hydrocarbon group containing a glycidyl group).

The epoxy-modified siloxane compound may be present in a content of typically 1 to 100 weight percent of the total weight of all epoxy compounds contained in the monomer composition. The upper limit of the content is preferably 80 weight percent, particularly preferably 70 weight percent, and most preferably 60 weight percent. The lower limit of the content is preferably 5 weight percent, particularly preferably 10 weight percent, and most preferably 20 weight percent.

Monomer Composition

The monomer composition according to the present invention is a monomer composition containing at least one vinyl ether compound (A) and at least one oxetane compound (B). The at least one vinyl ether compound (A) includes a multifunctional vinyl ether compound in an amount of 10 to 80 weight percent of the total weight of the monomer composition. The at least one oxetane compound (B) includes a bifunctional oxetane compound represented by Formula (b) in an amount of 0.5 to 20 weight percent of the total weight of the monomer composition.

The multifunctional vinyl ether compound is present in a content of 10 to 80 weight percent, preferably 10 to 70 weight percent, particularly preferably 15 to 70 weight percent, and most preferably 20 to 60 weight percent, of the total weight of the monomer composition (the total weight of all cationically polymerizable monomers contained in the monomer composition). Assume that the monomer composition, which contains the multifunctional vinyl ether compound in a content within the range, is incorporated with a photoacid generator to give a curable composition. This curable composition can offer rapid curability and can be rapidly cured upon ultraviolet irradiation to give a cured product having excellent substrate adhesion.

The bifunctional oxetane compound represented by Formula (b) is present in a content of 0.5 to 20 weight percent, preferably 1 to 20 weight percent, particularly preferably 3 to 20 weight percent, and most preferably 3 to 18 weight percent, of the total weight of the monomer composition (the total weight of all cationically polymerizable monomers contained in the monomer composition). Assume that the monomer composition, which contains the bifunctional oxetane compound represented by Formula (b) in a content within the range, is incorporated with a photoacid generator to give a curable composition. This curable composition resists cure inhibition in the presence of water and can be rapidly cured upon ultraviolet irradiation even in the presence of water, to give a cured product having excellent substrate adhesion.

The monofunctional oxetane compound represented by Formula (b') is present in a content of 5 to 80 weight percent, preferably 10 to 70 weight percent, particularly preferably 15 to 60 weight percent, and most preferably 20 to 50 weight percent, of the total weight of the monomer composition (the total weight of all cationically polymerizable monomers contained in the monomer composition).

The oxetane compounds (B) contained in the monomer composition according to the present invention may further include one or more other oxetane compounds than the bifunctional oxetane compounds represented by Formula (b) and the monofunctional oxetane compounds represented by Formula (b'). Such other oxetane compounds may be present in a content of typically 50 weight percent or less, and preferably 20 weight percent or less, of the total weight of the monomer composition according to the present invention.

The monomer composition according to the present invention preferably contains an epoxy compound (C). The epoxy compound (C) may be present in a content of typically 5 to 80 weight percent, preferably 10 to 60 weight percent, and particularly preferably 10 to 40 weight percent, of the total weight of the monomer composition (the total weight of all cationically polymerizable monomers contained in the monomer composition). Assume that the monomer composition containing the epoxy compound (C) in a content within the range is incorporated with a photoacid generator to give a curable composition. This curable composition can form a cured product having excellent adhesion to a wide variety of substrates, namely, a cured product having selectivity to a wide variety of substrates.

The monomer composition according to the present invention may contain one or more other cationically polymerizable monomers than the above-mentioned compounds. However, such other cationically polymerizable monomers may be present in a content of typically about 30 weight percent or less, and preferably 20 weight percent or less, of the total weight of the monomer composition (the total weight of all cationically polymerizable monomers contained in the monomer composition).

The monomer composition according to the present invention can be produced by uniformly mixing the vinyl ether compound (A), the oxetane compounds (B), and as needed, other cationically polymerizable monomer or monomers (such as the epoxy compound (C)) using a generally known mixing device. Non-limiting examples of the mixing device include planetary centrifugal mixers (rotation/revolution mixing and deaeration machines), homogenizers, planetary mixers, triple roll mills, and bead mills. The components may be mixed at once or in succession.

Curable Composition

The curable composition according to the present invention contains the monomer composition and a photoacid generator.

Photoacid Generator

The photoacid generator is a compound that generates an acid by light irradiation and is also called a "cationic photoinitiator". The photoacid generator includes a cationic moiety and an anionic moiety. The cationic moiety absorbs light. The anionic moiety acts as an acid source. Non-limiting examples of the photoacid generator include diazonium salt compounds, iodonium salt compounds, sulfonium salt compounds, phosphonium salt compounds, selenium salt compounds, oxonium salt compounds, ammonium salt compounds, bromine salt compounds, metallocene complexes, and iron-arene complexes. The curable composition may contain each of them alone or in combination.

Non-limiting examples of the cationic moieties in the sulfonium salt compounds include arylsulfonium ions such as (4-hydroxyphenyl)methylbenzylsulfonium ion, triphenylsulfonium ion, diphenyl[4-(phenylthio)phenyl]sulfonium ion, and tri-p-tolylsulfonium ion, of which triarylsulfonium ions are typified.

Non-limiting examples of the anionic moiety of the photoacid generator include $BF_4^-$, $CF_3SO_3^-$, $CH_3C_6H_4SO_3^-$, $CH_3(NO_2)C_6H_4SO_3^-$, $B(C_6F_5)_4^-$, $PF_6^-$, $[(Rf)_kPF_{6-k}]^-$ (where Rf represents, independently in each occurrence, alkyl except with fluorine atoms replacing 80% or more of hydrogen atoms of the alkyl; and k represents an integer of 1 to 5), $AsF_6^-$, $SbF_6^-$, $SbF_5OH^-$, halogenic anions, sulfonate anions, carboxylate anions, and sulfate anions.
Non-limiting examples of the photoacid generator for use in the present invention include compounds represented by the formulae:
[Chem. 13]
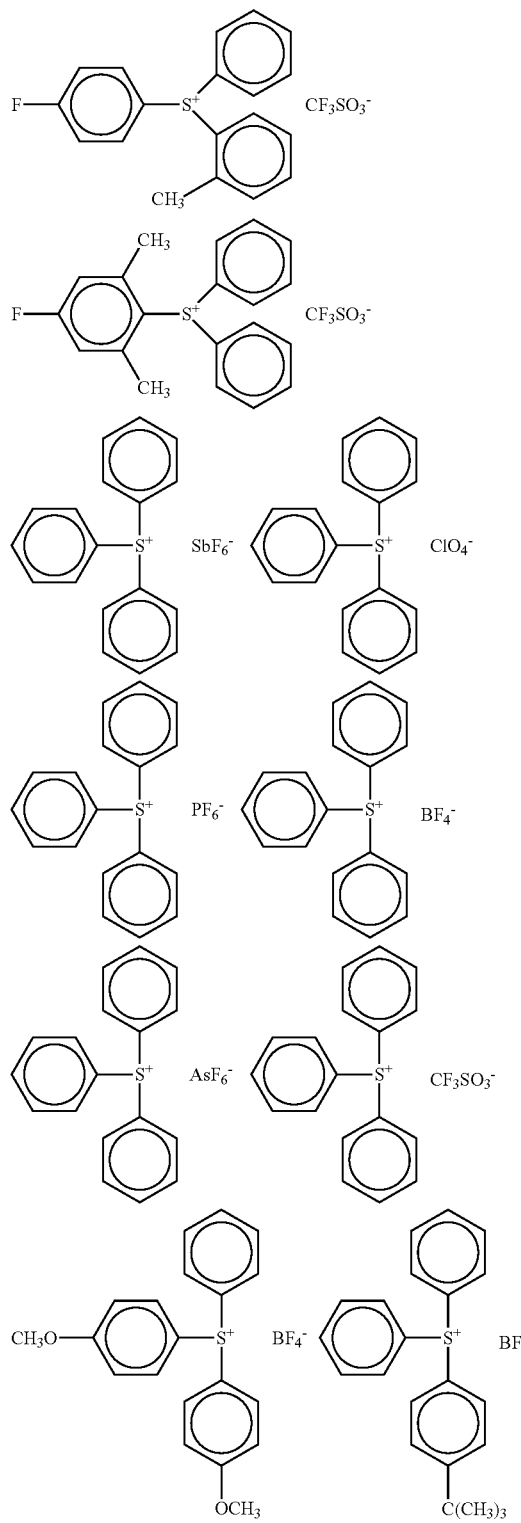
[Chem. 14]
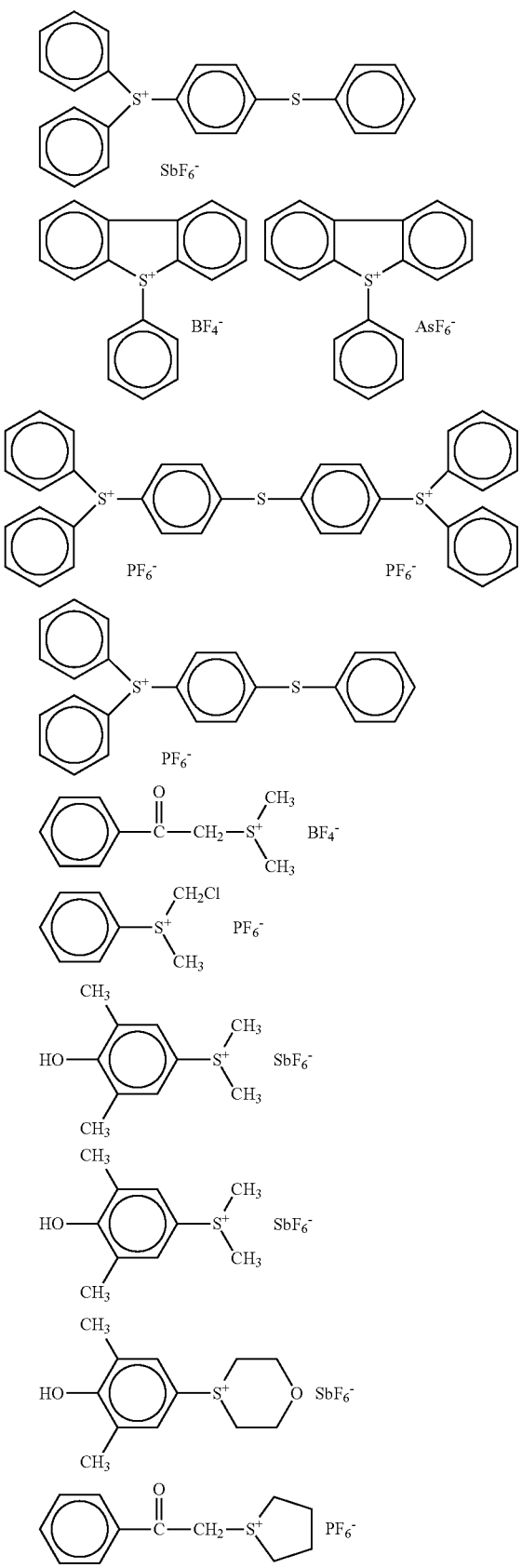

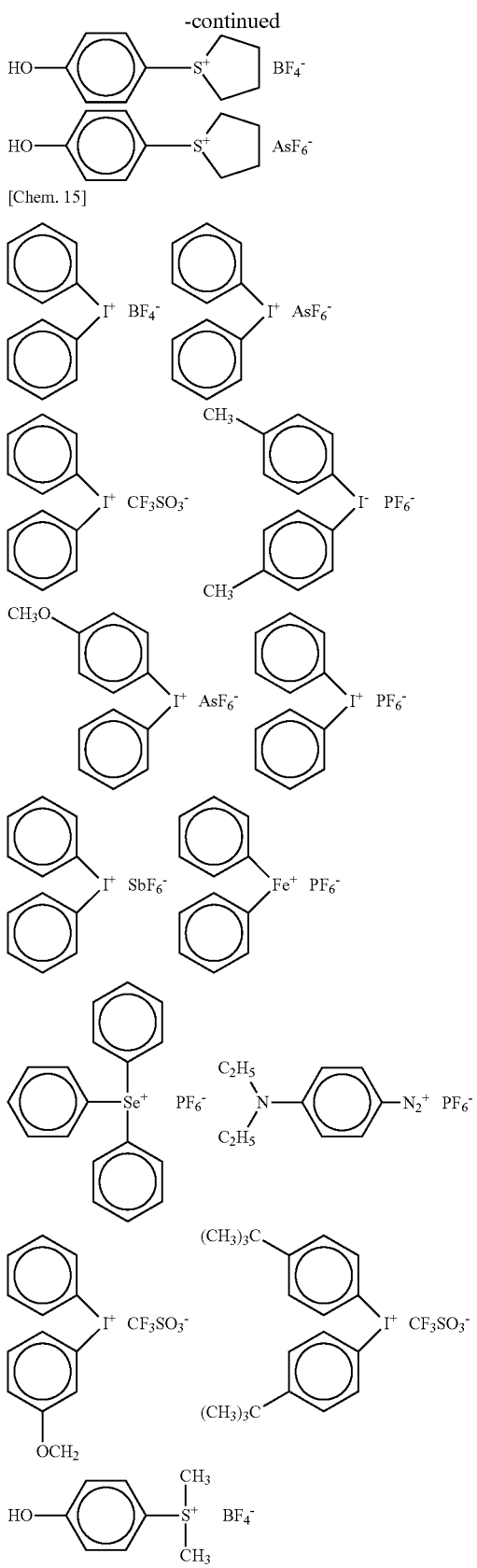

[Chem. 15]

The photoacid generator for use in the present invention may be selected from commercial products available typically under the trade names of: CYRACURE UVI-6970, CYRACURE UVI-6974, CYRACURE UVI-6990, and CYRACURE UVI-950 (each from Union Carbide Corporation, U.S.A.); IRGACURE 250, IRGACURE 261, IRGACURE 264, IRGACURE 270, and IRGACURE 290 (each from BASF SE); CG-24-61 (from Ciba Geigy Ltd.); ADEKA OPTOMER SP-150, ADEKA OPTOMER SP-151, ADEKA OPTOMER SP-170, and ADEKA OPTOMER SP-171 (each from ADEKA CORPORATION); DAICAT II (from Daicel Corporation); UVAC 1590 and UVAC 1591 (each from DAICEL-CYTEC Company, Ltd.); CI-2064, CI-2639, CI-2624, CI-2481, CI-2734, CI-2855, CI-2823, CI-2758, and CIT-1682 (each from Nippon Soda Co., Ltd.); PI-2074 (from Rhodia, toluylcumyliodonium tetrakis(pentafluorophenyl)borate); FFC509 (from 3M Company); BBI-102, BBI-101, BBI-103, MPI-103, BDS-105, TPS-103, MDS-103, MDS-105, MDS-203, MDS-205, DTS-102, DTS-103, NAT-103, NDS-103, BMS-105, and TMS-105 (each from Midori Kagaku Co., Ltd.); CD-1010, CD-1011, and CD-1012 (each from Sartomer Company, Inc., U.S.A.); CPI-100P, CPI-101A, CPI-110P, CPI-110A, and CPI-210S (each from San-Apro Ltd.); and UVI-6992 and UVI-6976 (each from The Dow Chemical Company).

The monomer composition in the curable composition according to the present invention may be present in a content of typically about 50 to 99.9 weight percent, and preferably 70 to 99.5 weight percent, of the total weight (100 weight percent) of the curable composition.

The photoacid generator in the curable composition according to the present invention may be present in a proportion of typically about 0.1 to 20 parts by weight, and preferably 0.5 to 10 parts by weight, per 100 parts by weight of the monomer composition.

The curable composition according to the present invention is preferably a solvent-free system, namely, is preferably approximately devoid of solvents. This is preferred because the curable composition can have better drying behavior, can be applied even to a substrate being susceptible to deterioration by solvents, and less suffers from odors generated due to volatilization of solvents. The curable composition may have a solvent content of 10 weight percent or less, preferably 5 weight percent or less, and particularly preferably 1 weight percent or less, of the total weight (100 weight percent) of the curable composition.

In addition to the monomer composition and the photoacid generator, the curable composition according to the present invention may further contain one or more other components as needed. Non-limiting examples of such other components include known or common sensitizers (such as acridine compounds, benzoflavins, perylenes, anthracenes, thioxanthone compounds, and laser dyes), sensitizing auxiliaries, antioxidants, and stabilizers such as amines. In particular, assume that the curable composition according to the present invention is to be used in applications where the curable composition is cured by irradiation with light from a UV-LED. In this case, the curable composition preferably contains a sensitizer alone or, as needed, in combination with a sensitizing auxiliary. This is preferred for better ultraviolet absorptivity of the photoacid generator to allow the curable composition to have better curability. These components may be present in a content of typically about 0.05 to about 10 weight percent, and preferably 0.1 to 5 weight percent, of the total weight (100 weight percent) of the curable composition. When two or more different substances belonging to these components are present, the term "content" refers to the total content of them.

The curable composition according to the present invention has a surface tension (at 25° C. and 1 atmospheric pressure) of typically about 10 to about 50 mN/m, preferably 15 to 40 mN/m, and particularly preferably 15 to 30 mN/m. The curable composition according to the present invention has a viscosity (at 25° C. and a shear rate of 10 (1/s)) of typically about 1 to about 1000 mPa·s, preferably 3 to 400 mPa·s, particularly preferably 5 to 50 mPa·s, and most preferably 10 to 30 mPa·s. The curable composition according to the present invention, as having this configuration, has excellent dischargeability and/or excellent filling properties.

The curable composition according to the present invention can be rapidly cured upon ultraviolet irradiation even in the presence of oxygen and/or water, to form a cured product. The curable composition, when used in a UV-curable inkjet ink, allows the ink to resist bleeding, to less cause odors, and to form an ink layer (ink film) having excellent print quality.

A light source for the ultraviolet ray is not limited, as long as being capable of applying light to the curable composition to generate an acid in the curable composition. The light source for use herein may be selected typically from UV-LEDs, mercury lamps such as low-, medium-, or high-pressure mercury lamps, mercury xenon lamps, metal halide lamps, tungsten lamps, arc lamps, excimer lamps, excimer laser, semiconductor laser, YAG laser, laser systems using laser in combination with a nonlinear optical crystal, and high-frequency induction ultraviolet generators. The quantity (integrated irradiance) of ultraviolet rays to be irradiated is typically about 10 to about 1000 mJ/cm$^2$.

After ultraviolet irradiation, the curable composition according to the present invention may be subjected further to a heat treatment. The curable composition, when subjected to a heat treatment, can be cured with a still higher degree of cure. The heat treatment may be performed at a heating temperature of about 40° C. to about 200° C. for a heating time of about 1 minute to about 15 hours. Such a higher degree of cure can also be obtained by leaving the curable composition after ultraviolet irradiation left stand at room temperature (about 20° C.) for about 1 to about 48 hours.

In addition, the curable composition according to the present invention can form a cured product having excellent adhesion to a wide variety of substrates. Non-limiting examples of the substrates include glass; metals such as aluminum foil and copper foil; plastics such as polyethylenes, polypropylenes, poly(ethylene terephthalate)s (PETs), vinyl chloride resins, and polycarbonates; natural rubber; isobutylene-isoprene rubber; foams typically of polyurethanes and polychloroprene rubber; wood; woven fabrics; nonwoven fabrics; cloth; paper such as woodfree paper, glassine paper, kraft paper, and Japanese paper; silicon wafers; ceramics; and composites of them.

The curable composition according to the present invention, as having the characteristic properties, is advantageously usable typically as or for UV-curable inkjet ink materials, coating materials, adhesives, encapsulants, civil engineering and construction materials, laminates and other electric/electronic components, photoresists, solder masks (solder resists), interlayer components for multilayer printed circuit boards, insulating materials, repairing materials for concrete buildings, casting materials, sealants, stereolithographic materials, and optical materials for optical components such as lenses and optical waveguides.

In particular, the curable composition according to the present invention is preferably used as or for UV-curable inkjet ink materials (such as a UV-curable inkjet transparent ink). Such a UV-curable inkjet transparent ink including the curable composition according to the present invention, when combined with at least one selected from pigments and dyes, can form a variety of pigment/dye inks (pigment inks, dye inks, and inks each containing both a pigment and a dye). The curable composition is also usable as or for priming inks and varnishing inks. The priming inks and varnishing inks are inks which are to be applied before and/or after the application of a pigment/dye ink and allow the pigment/dye ink to be more readily fixed to the substrate surface and to form an ink layer with bright coloration and high image quality. The priming inks and varnishing inks also contribute to elimination or minimization of ink strike-through and offer better weatherability and better water resistance.

UV-Curable Inkjet Ink

The UV-curable inkjet ink (in particular, the pigment/dye ink) according to the present invention contains the curable composition and at least one selected from pigments and dyes (pigment and/or dye). The curable composition herein acts as a UV-curable inkjet transparent ink.

Pigments

The pigments for use herein can be selected, without limitation, from coloring materials that are generally known as pigments and are dispersible in the curable composition. The pigments each preferably have an average particle diameter of about 300 nm or less. This is preferred because the ink is dischargeable excellently, can fly satisfactorily, and offers excellent print reproducibility. The ink may contain each of different pigments alone or in combination.

The pigments may be selected from those having any of other properties such as magnetism, fluorescence, electroconductivity, and dielectricity, in addition to color developing and coloring abilities. In this case, the pigments can impart a variety of functions to images.

Non-limiting examples of such pigments usable herein include inorganic pigments, organic pigments, and fluorescent pigments. Non-limiting examples of the inorganic pigments include earthen pigments such as ocher and amber; lapis lazuli; azurite; chalk; white wash; white lead; vermilion; ultramarine; viridian; cadmium red; carbonaceous pigments such as carbon black, carbon refined, and carbon nanotubes; metal oxide pigments such as iron black, cobalt blue, zinc oxide, titanium oxide, chromium oxide, and iron oxides; metal sulfide pigments such as zinc sulfide; metal sulfates; metal carbonates such as calcium carbonate and magnesium carbonate; metal silicates; metal phosphates; and metal powders such as aluminum powder, bronze powder, and zinc powder. Non-limiting examples of the organic pigments include insoluble azo pigments such as monoazo yellow, monoazo red, monoazo violet, disazo yellow, disazo orange, and pyrazolone pigments; soluble azo pigments such as azo yellow lake and azo lake red; benzimidazolone pigments; β-naphthol pigments; naphthol AS pigment; condensed azo pigments; quinacridone pigments such as quinacridone red and quinacridone magenta; perylene pigments such as perylene red and perylene scarlet; perinone pigments such as perinone orange; isoindolinone pigments such as isoindolinone yellow and isoindolinone orange; isoindoline pigments such as isoindoline yellow; dioxazine pigments such as dioxazine violet; thioindigo pigments; anthraquinone pigments; quinophthalone pigments such as quinophthalone yellow; metal complex pigments; diketopyrrolopyrrole pigments; phthalocyanine pigments such as phthalocyanine blue and phthalocyanine green; and dye lake pigments. Non-limiting examples of the fluorescent pigments include inorganic fluorophors and organic fluorophors.

Dyes

Non-limiting examples of the dyes include nitroaniline, phenyl monoazo, pyridone azo, quinophthalone, styryl, anthraquinone, naphthalimide azo, benzothiazolylazo, phenyl disazo, and thiazolylazo dyes.

The UV-curable inkjet ink according to the present invention may contain the pigment and/or dye in a proportion of typically about 0.5 to about 20 parts by weight, and preferably 1 to 10 parts by weight, per 100 parts by weight of the curable composition. When the ink contains two or more different substances belonging to these components, the term "proportion" refers to the total proportion of them.

The UV-curable inkjet ink according to the present invention may further contain a dispersant for better dispersibility of the pigment and/or dye. Non-limiting examples of the dispersant include nonionic surfactants, ionic surfactants, charging agents, polymeric dispersants (such as products available under the trade names of Solsperse 24000 and Solsperse 32000, from Avecia Ltd.). The UV-curable inkjet ink may contain each of them alone or in combination.

The dispersant may be present in a proportion of typically about 1 to about 50 parts by weight, and preferably 3 to 30 parts by weight, per 100 parts by weight of the pigment and/or dye.

The UV-curable inkjet ink according to the present invention, as containing the curable composition, can form an ink layer with extremely high definition in an air atmosphere at high speed, where the ink layer can be formed without limitations on humidity conditions and substrates, while less causing odors.

EXAMPLES

The present invention will be illustrated in further detail with reference to several examples below. It should be noted, however, that the examples are by no means intended to limit the scope of the present invention.

Example 1

Materials, i.e., 25 parts by weight of ONB-DVE, 25 parts by weight of CELLOXIDE 2021P, 10 parts by weight of OXT-121, 40 parts by weight of OXT-212, and 5 parts by weight of a photoacid generator were mixed and yielded a curable composition (1). This had a surface tension (at 25° C. and 1 atmospheric pressure) of 24.5 mN/m and a viscosity (at 25° C. and a shear rate of 10 (1/s) of 17 mPa·s.

Curability Evaluation

The prepared curable composition (1) was applied to a glass plate to form a coating having a thickness of 5 μm, and irradiated with ultraviolet rays using a mercury-xenon lamp (trade name LC8 LIGHTNINGCURE L9588, supplied by Hamamatsu Photonics K.K.) as a light source. An integrated irradiance (in mJ/cm$^2$) until the coating became tack-free was measured, on the basis of which the curability was evaluated. Specifically, an integrated irradiance until the coating became tack-free or the coating remained without separation from the glass plate upon rubbing of the coating surface with a ply of Kimwipes (registered trademark) was measured. The integrated irradiance is an integrated irradiance necessary for curing of such a curable composition approximately devoid of water (water-free curable composition).

Curability Evaluation in the Presence of Water

The curable composition (1) (100 parts by weight) was combined with and stirred with water (5 parts by weight) and yielded a water-containing curable composition (1).

An integrated irradiance (in mJ/cm$^2$) until the resulting coating became tack-free was measured by a procedure similar to the procedure in the above-mentioned curability evaluation, except for using the water-containing curable composition (1) instead of the curable composition (1). The rate of increase in integrated irradiance caused by water addition was calculated according to an expression below, to evaluate curability in the presence of water according to criteria as follows.

Rate of increase (%) in integrated irradiance=$\{((\text{Integrated irradiance necessary for curing of water-containing curable composition})/(\text{Integrated irradiance necessary for curing of water-free curable composition}))-1\} \times 100$ Evaluation criteria for curability in the presence of water:

Poor curability (Poor): rate of increase in integrated irradiance of 20% or more;

Good curability (Good): rate of increase in integrated irradiance of from 10% to less than 20%; and Very good curability (VG): rate of increase in integrated irradiance of less than 10%.

Substrate Adhesion Evaluation

The curable composition (1) was applied to a substrate (glass plate or PET plate) to form a coating having a thickness of 5 μm, irradiated with ultraviolet rays using a mercury-xenon lamp as a light source until the coating became tack-free, and yielded a laminate of the coating and the glass plate, and a laminate of the coating and the PET plate.

Each eleven (11) slits were made on the coating surface of each of the laminates lengthwise and crosswise at 1-mm intervals in a grid manner and yielded samples each having hundred 1-mm square crosscuts. A cellophane adhesive tape (trade name Cellotape (registered trademark), supplied by Nichiban Co., Ltd., 24 mm wide) was laminated onto the crosscuts by one reciprocating movement of a 2-kg roller, and then removed by quickly pulling the tape in a direction perpendicular to the substrate at an ambient temperature of 20° C. The adhesion was evaluated on the basis of the number of crosscuts remained without separation according to the following criteria (in conformity with JIS K-5400: 1990).

Substrate Adhesion Evaluation Criteria:

Very good substrate adhesion (VG): 0 to 15 crosscuts were separated from the substrate;

Good substrate adhesion (Good): 16 to 30 crosscuts were separated from the substrate; and Poor substrate adhesion (Poor): 31 to 100 crosscuts were separated from the substrate.

Examples 2 to 19 and Comparative Examples 1 to 3

Procedures similar to that in Example 1 were performed, except for employing formulations of monomer compositions (in part by weight) as given in the following tables. Results are collectively presented in the tables.

TABLE 1

| | Curable composition | | | | | | | | |
|---|---|---|---|---|---|---|---|---|---|
| | Monomer composition | | | | Curability | | | | |
| | Vinyl ether compound (part by weight) | Epoxy compound (part by weight) | Oxetane compound (part by weight) | Photoacid generator (part by weight) | (integrated irradiance in mJ/cm²) | | Curability in the presence of water | Substrate adhesion | |
| | | | | | Water-free composition | Composition containing 5% water | | Glass plate | PET plate |
| Example 1 | ONB-DVE (25) | CELLOXIDE 2021P (25) | OXT-212 (40) OXT-121 (10) | 5 | 300 | 300 | VG | VG | VG |
| Example 2 | ONB-DVE (50) | CELLOXIDE 2021P (20) | OXT-212 (25) OXT-121 (5) | 5 | 200 | 200 | VG | VG | VG |
| Example 3 | ISB-DVE (25) | CELLOXIDE 2021P (25) | OXT-212 (40) OXT-121 (10) | 5 | 325 | 325 | VG | VG | VG |
| Example 4 | ISB-DVE (50) | CELLOXIDE 2021P (20) | OXT-212 (25) OXT-121 (5) | 5 | 225 | 225 | VG | VG | VG |
| Example 5 | ISB-DVE (50) | — | OXT-212 (45) OXT-121 (5) | 5 | 300 | 300 | VG | VG | VG |
| Example 6 | ISB-DVE (50) | — | ALOX (45) OXT-121 (5) | 5 | 250 | 250 | VG | VG | VG |
| Example 7 | ISB-DVE (25) 4CH-DVE (25) | — | ALOX (45) OXT-121 (5) | 5 | 200 | 200 | VG | VG | VG |
| Example 8 | ISB-DVE (25) 4CH-DVE (25) | — | OXT-212 (45) OXT-121 (5) | 5 | 250 | 250 | VG | Good | VG |
| Example 9 | ISB-DVE (40) 4CH-DVE (10) | — | OXT-212 (45) OXT-121 (5) | 5 | 300 | 300 | VG | VG | VG |
| Example 10 | TEGDVE (30) | CELLOXIDE 2021P (20) | ALOX (40) OXT-121 (10) | 5 | 400 | 425 | VG | VG | VG |
| Example 11 | ISB-DVE (25) 4CH-DVE (15) TEGDVE (10) | — | ALOX (40) OXT-121 (10) | 5 | 200 | 200 | VG | VG | VG |
| Example 12 | ISB-DVE (40) 4CH-DVE (10) TEGDVE (5) | — | ALOX (40) OXT-121 (5) | 5 | 200 | 200 | VG | VG | VG |
| Example 13 | ISB-DVE (25) 4CH-DVE (15) TEGDVE (10) | — | OXT-212 (45) OXT-121 (5) | 5 | 300 | 300 | VG | VG | VG |
| Example 14 | 4CH-DVE (25) TEGDVE (25) | — | OXT-212 (35) OXT-121 (15) | 5 | 300 | 300 | VG | Good | VG |
| Comp. Ex. 1 | ONB-DVE (50) | CELLOXIDE 2021P (20) | OXT-212 (30) | 5 | 200 | 300 | Poor | VG | VG |
| Comp. Ex. 2 | ISB-DVE (50) | CELLOXIDE 2021P (20) | OXT-212 (30) | 5 | 300 | 450 | Poor | VG | VG |
| Comp. Ex. 3 | ISB-DVE (50) | — | OXT-212 (50) | 5 | 300 | 600 | Poor | VG | VG |

TABLE 2

| | Curable composition | | | | | | | | |
|---|---|---|---|---|---|---|---|---|---|
| | Monomer composition | | | | Curability | | | | |
| | Vinyl ether compound (part by weight) | Epoxy compound (part by weight) | Oxetane compound (part by weight) | Photoacid generator (part by weight) | (integrated irradiance in mJ/cm²) | | Curability in the presence of water | Substrate adhesion | |
| | | | | | Water-free composition | Composition containing 5% water | | Glass plate | PET plate |
| Example 15 | ONB-DVE (25) | CELLOXIDE 2021P (10) X-22-163 (15) | OXT-212 (40) OXT-121 (10) | 5 | 300 | 300 | VG | VG | VG |
| Example 16 | ONB-DVE (50) | CELLOXIDE 2021P (10) KF-105 (10) | OXT-212 (25) OXT-121 (5) | 5 | 250 | 250 | VG | VG | VG |
| Example 17 | ISB-DVE (25) | CELLOXIDE 2021P (10) X-22-163 (15) | OXT-212 (40) OXT-121 (10) | 5 | 350 | 350 | VG | VG | VG |
| Example 18 | ISB-DVE (50) | CELLOXIDE 2021P (10) KF-105 (10) | OXT-212 (25) OXT-121 (5) | 5 | 250 | 250 | VG | VG | VG |
| Example 19 | ISB-DVE (25) CHVE (25) | CELLOXIDE 2021P (18) EP0408 (2) | OXT-212 (25) OXT-121 (5) | 5 | 350 | 350 | VG | VG | VG |

The compounds used in the examples and comparative examples are as follows.

Vinyl Ether Compounds

ONB-DVE: the compound represented by Formula (a-1), trade name ONB-DVE, supplied by Daicel Corporation ISB-DVE: the compound represented by Formula (a-2), trade name ISB-DVE, supplied by Daicel Corporation

[Chem. 16]

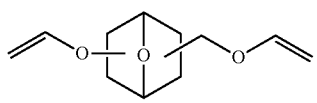
(a-1)

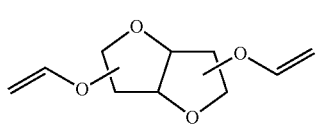
(a-2)

4CH-DVE: cyclohexanediol divinyl ether, trade name 4CH-DVE, supplied by Daicel Corporation TEGDVE: triethylene glycol divinyl ether, trade name TEGDVE, supplied by Nippon Carbide Industries, Co., Inc.

Epoxy Compounds

CELLOXIDE 2021P: 3,4-epoxycyclohexylmethyl (3,4-epoxy)cyclohexanecarboxylate, trade name CELLOXIDE 2021P, supplied by Daicel Corporation X-22-163: a silicone modified with epoxy at both termini, having an epoxy equivalent of 200 g/mol, trade name X-22-163, supplied by Shin-Etsu Chemical Co., Ltd.

KF-105: a silicone modified with epoxy at both termini, having an epoxy equivalent of 490 g/mol, trade name KF-105, supplied by Shin-Etsu Chemical Co., Ltd.

EP0408: an epoxy-modified (3,4-epoxycyclohexylmethyl-modified) polyorganosilsesquioxane, having a molecular weight of 1418.20, trade name EP0408, supplied by Toyotsu Chemiplas Corporation Oxetane Compounds OXT-121: a multifunctional oxetane compound, 1,4-bis[(3-ethyl-3-oxetanylmethoxy)methyl]benzene represented by Formula (b-1), trade name ARON OXETANE OXT-121, supplied by Toagosei Co., Ltd.

[Chem. 17]

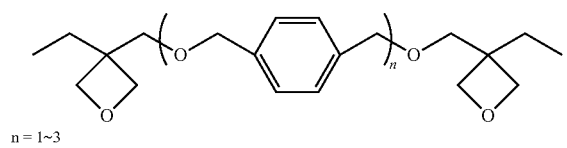
(b-1)

n = 1~3

OXT-212: a monofunctional oxetane compound, 3-ethyl-3-[(2-ethylhexyloxy)methyl]oxetane, trade name ARON OXETANE OXT-212, supplied by Toagosei Co., Ltd.

ALOX: 3-allyloxyoxetane

Photoacid Generator

Trade name CPI-110P, supplied by San-Apro Ltd., a 99.5:0.5 mixture of diphenyl[4-(phenylthio)phenyl]sulfonium hexafluorophosphate and thiodi-p-phenylenebis(diphenylsulfonium) bis(hexafluorophosphate)

INDUSTRIAL APPLICABILITY

The curable composition containing the monomer composition according to the present invention has low viscosity and offers excellent dischargeability before ultraviolet irradiation, and, upon ultraviolet irradiation, can be rapidly cured even in the presence of oxygen and/or water, to form a cured product having excellent adhesion to a wide variety of substrates. The curable composition resists deterioration in curability even when absorbing moisture from the air during the storage process. Namely, the curable composition has excellent storage stability. In addition, the curable composition according to the present invention, as having excellent curability, less causes monomers to remain as unreacted, and significantly less causes odors derived from such unreacted monomers. Thus, the curable composition is advantageously usable for UV-curable inkjet inks.

The invention claimed is:

1. A monomer composition comprising:
    at least one vinyl ether compound (A); and
    at least one oxetane compound (B);
    the at least one vinyl ether compound (A) comprising
        a multifunctional vinyl ether compound in an amount of 10 to 80 weight percent of the total weight of the monomer composition,
    the at least one oxetane compound (B) comprising:
        a bifunctional oxetane compound represented by Formula (b) in an amount of 0.5 to 15 weight percent of the total weight of the monomer composition; and
        a monofunctional oxetane compound represented by Formula (b') in an amount of 5 to 45 weight percent of the total weight of the monomer composition,
    Formulae (b) and (b') expressed as follows:

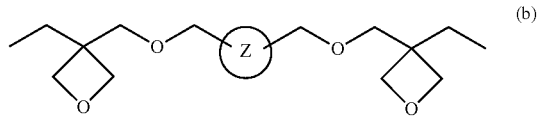
(b)

wherein Ring Z is selected from an aromatic hydrocarbon ring and a structure including two or more aromatic hydrocarbon rings bonded to each other through a single bond or a linkage group,

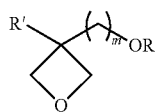
(b')

wherein R represents a monovalent aliphatic hydrocarbon group; R' is selected from hydrogen and ethyl; and m represents an integer of 0 or more.

2. The monomer composition according to claim 1, wherein the multifunctional vinyl ether compound comprises a compound having a structure containing an alicyclic hydrocarbon group or heterocyclic group with two or more vinyl ether groups being bonded.

3. The monomer composition according to claim 1, further comprising
    an epoxy compound (C) including an epoxy compound containing a cyclohexene oxide group, the epoxy compound (C) serving as a cationically curable monomer.

4. The monomer composition according to claim 3,
wherein the epoxy compound (C) is present in a content of 5 to 80 weight percent of the total weight of the monomer composition.

5. A curable composition comprising:
the monomer composition according to claim 1; and
a photoacid generator.

6. The curable composition according to claim 5, further comprising
a sensitizer alone or in combination with a sensitizing auxiliary.

7. The curable composition according to claim 5,
which has a surface tension, at 25° C. and 1 atmospheric pressure, of 10 to 50 mN/m and a viscosity, at 25° C. and a shear rate of 10 (1/s), of 1 to 1000 mPa·s.

8. A UV-curable inkjet ink comprising:
the curable composition according to claim 5; and
at least one selected from the group consisting of pigments and dyes.

9. The UV-curable inkjet ink according to claim 8, further comprising
a dispersant.

\* \* \* \* \*